United States Patent
Gonzalez-Hernandez

(10) Patent No.: US 12,465,375 B2
(45) Date of Patent: Nov. 11, 2025

(54) LOW PROFILE DRILL AND/OR K-wire GUIDE AND METHOD FOR USE THEREOF

(71) Applicant: Eduardo Gonzalez-Hernandez, Miami, FL (US)

(72) Inventor: Eduardo Gonzalez-Hernandez, Miami, FL (US)

( * ) Notice: Subject to any disclaimer, the term of this patent is extended or adjusted under 35 U.S.C. 154(b) by 287 days.

(21) Appl. No.: 18/197,467

(22) Filed: May 15, 2023

(65) Prior Publication Data
US 2023/0277197 A1    Sep. 7, 2023

Related U.S. Application Data

(63) Continuation of application No. 17/016,660, filed on Sep. 10, 2020, now abandoned.

(60) Provisional application No. 62/899,272, filed on Sep. 12, 2019.

(51) Int. Cl.
   *A61B 17/17*    (2006.01)

(52) U.S. Cl.
   CPC ...... *A61B 17/1728* (2013.01); *A61B 17/1796* (2013.01)

(58) Field of Classification Search
   None
   See application file for complete search history.

(56) References Cited

U.S. PATENT DOCUMENTS

| | | | |
|---|---|---|---|
| 6,019,762 A * | 2/2000 | Cole | A61B 17/8863 |
| | | | 606/104 |
| 9,687,260 B2 * | 6/2017 | O'Reilly | A61B 17/1703 |
| 10,537,371 B2 | 1/2020 | Viola et al. | |
| 10,603,090 B2 | 3/2020 | Orbay et al. | |
| 10,806,493 B2 * | 10/2020 | Sadat | A61B 17/66 |
| 10,888,363 B2 | 1/2021 | Greenhalgh et al. | |
| 10,888,365 B2 | 1/2021 | Tyber et al. | |
| 11,045,234 B2 | 6/2021 | Sixto et al. | |
| 11,058,467 B2 | 7/2021 | Lueth et al. | |
| 11,058,546 B2 | 7/2021 | Hollis et al. | |
| 11,065,042 B2 | 7/2021 | Garvey et al. | |
| 11,071,456 B2 | 7/2021 | Hunter et al. | |
| 11,071,570 B2 | 7/2021 | Laird, Jr. et al. | |
| 2002/0143338 A1 * | 10/2002 | Orbay | A61B 17/68 |
| | | | 606/295 |
| 2013/0172944 A1 * | 7/2013 | Fritzinger | A61B 17/0401 |
| | | | 606/232 |
| 2018/0263669 A1 * | 9/2018 | Peterson | A61B 17/8605 |

* cited by examiner

*Primary Examiner* — Christian A Sevilla

(57) ABSTRACT

A drill and/or K-wire guide for receipt in an aperture formed in a bone plate is provided. The drill and/or K-wire guide can include a first end, an opposite second end, an annular outer surface extending between the first end and the second end, a maximum diameter, a maximum thickness perpendicular to the maximum diameter, a first opening at the first end, a second opening at the second end, and an aperture extending between the first opening and the second opening. The aperture formed in the drill and/or K-wire guide can be configured for receipt of at least one of a drill and a K-wire therethrough, and the drill and/or K-wire guide can be configured for receipt in the aperture formed in the bone plate.

20 Claims, 3 Drawing Sheets

LOW PROFILE DRILL AND/OR K-wire GUIDE AND METHOD FOR USE THEREOF

The present application is a continuation of U.S. Ser. No. 17/016,660, filed Sep. 10, 2020; which claims the benefit of U.S. Provisional Application No. 62/899,272 filed on Sep. 12, 2019; all of which are incorporated herein by reference.

BACKGROUND

Field

The present technology generally relates to a drill guide for use with a bone plate that can serve as a low profile removable drill guide and/or K-wire guide.

In the field of orthopedic surgery, many devices exist to facilitate the repair of fractures. A bone plate with apertures prepared to receive corresponding fasteners is an example of such a device. A very common mode of mating a fastener to a bone plate is via use of a locking screw and a threaded aperture in the bone plate. The locking screw includes a threaded head, and the threaded head is ultimately engaged to complimentary threads provided in the threaded aperture of the bone plate. This mode of assembling a locking screw to the bone plate is called locking fixation, and it provides an angle stable construct of the fastener to the bone plate.

The threads in the apertures of the bone plates require that the locking screws be inserted in a prescribed direction to avoid cross-threading. Therefore, it is necessary for the surgeon to use a drill guide prior to drilling into bone. Conventional drill guides can be separate surgical instruments that are attached to the bone plates prior to drilling that serve to guide drills into bone. Other types of conventional drill guides can be preattached to the bone plates. However, these types of conventional drill guides protrude outwardly from the bone plates. The drill is inserted through a conventional drill guide to drill into bone to create a hole that aids in properly orienting a locking screw inserted into the hole relative to the bone plate. After drilling is complete, the surgeon removes the drill guide and installs the locking screw such that the threads of the threaded head are engaged to the complimentary threads of the threaded aperture without cross threading.

Without use of drill guides, the locking screws can sub-optimally cross-thread with the threads provided in the apertures. Such cross-threading can lead to significantly reduced locking fixation between the locking screw and the bone plate. And such cross-threading can lead to unwanted protrusion of the threaded head from the aperture of the bone plate. Some of the above-discussed conventional drill guides are assembled to the bone plates by the surgeon just before drilling into the bone. This particular step can be difficult considering the environment in which the surgeon has to operate. Soft tissue including, but not limited to, tendons and ligaments may interfere and the surfaces may become slippery or sticky with blood. And other types of the above-discussed conventional drill guides are pre-assembled to the bone plates, but these conventional drill guides protrude outwardly from the bone plates. Soft tissue also can interfere with such protrusions, and make placement of the bone plates relative to the bone difficult.

Therefore, there is a need for a device that can be configured to be used with drills and/or K-wires, that can be preattached to a bone plate to reduce or eliminate the need for assembly to the bone plate during surgery, and that has a low profile relative to the bone plate to inhibit interference with soft tissue including, but not limited to, tendons and ligaments.

SUMMARY OF THE INVENTION

The present disclosure contemplates drill and/or K-wire guide for receipt in an aperture formed in a bone plate, the drill and/or K-wire guide including a first end, an opposite second end, an annular outer surface extending between the first end and the second end, a maximum diameter, a maximum thickness perpendicular to the maximum diameter, a first opening at the first end, a second opening at the second end, and an aperture extending between the first opening and the second opening; where the aperture formed in the drill and/or K-wire guide is configured for receipt of at least one of a drill and a K-wire therethrough, and where the drill and/or K-wire guide is configured for receipt in the aperture formed in the bone plate, the aperture formed in the bone plate having a maximum diameter and a maximum thickness perpendicular to the maximum diameter, the maximum diameter of the drill and/or K-wire guide corresponding to the maximum diameter of the aperture formed in the bone plate, and the maximum thickness of the drill and/or K-wire guide being less than, equal to, or slightly greater than maximum depth of the aperture formed in the bone plate to provide a low profile for the drill and/or K-wire guide.

The present disclosure further contemplates a combination of a bone plate and a drill and/or K-wire guide, the combination including a first end, an opposite second end, an annular outer surface extending between the first end and the second end, a maximum diameter, a maximum thickness perpendicular to the maximum diameter, a first opening at the first end, a second opening at the second end, and an aperture extending between the first opening and the second opening; and a bone plate having an upper surface, a lower surface, and an aperture formed in the bone plate that extends between the upper surface and the lower surface; where the aperture formed in the drill and/or K-wire guide is configured for receipt of at least one of a drill and a K-wire therethrough, and where the drill and/or K-wire guide is configured for receipt in the aperture formed in the bone plate, the aperture formed in the bone plate having a maximum diameter and a maximum thickness perpendicular to the maximum diameter, the maximum diameter of the drill and/or K-wire guide corresponding to the maximum diameter of the aperture formed in the bone plate, and the maximum thickness of the drill and/or K-wire guide being less than, equal to, or slightly greater than maximum depth of the aperture formed in the bone plate to provide a low profile for the drill and/or K-wire guide.

The present disclosure still further contemplates a combination of a bone plate and a drill and/or K-wire guide, the combination including a first end, an opposite second end, an annular outer surface extending between the first end and the second end, a maximum diameter, a maximum thickness perpendicular to the maximum diameter, a first engagement feature provided on the annular outer surface, a first opening at the first end, a second opening at the second end, and an aperture extending between the first opening and the second opening; and a bone plate having an upper surface, a lower surface, an aperture formed in the bone plate that extends between the upper surface and the lower surface, and a second engagement feature provided in the aperture formed in the bone plate; where the first engagement feature and the second engagement feature are configured for engagement to one another; where the aperture formed in the drill and/or K-wire guide is configured for receipt of at least one of a drill and a K-wire therethrough, and where the drill and/or K-wire guide is configured for receipt in the aperture formed in the bone plate, the aperture formed in the bone plate having a maximum diameter and a maximum thickness perpendicular to the maximum diameter, the maximum diameter of the drill and/or K-wire guide corresponding to the maximum diameter of the aperture formed in the bone plate, and the maximum thickness of the drill and/or K-wire guide being less than, equal to, or slightly greater than maximum depth of the aperture formed in the bone plate to provide a low profile for the drill and/or K-wire guide.

These and other objects of the present invention will be apparent from review of the following specification and the accompanying drawings.

DETAILED DESCRIPTION

Figure 1A:
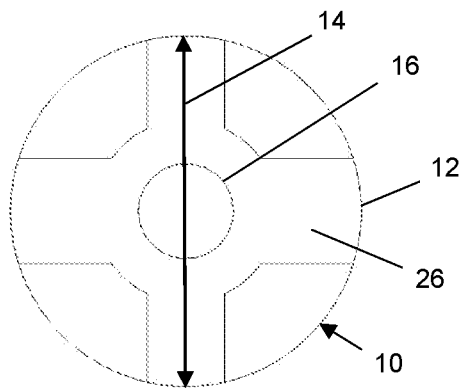
FIG. 1A is a top plan view of a drill and/or K-wire guide according to an embodiment of the present disclosure.
Figure 1B:
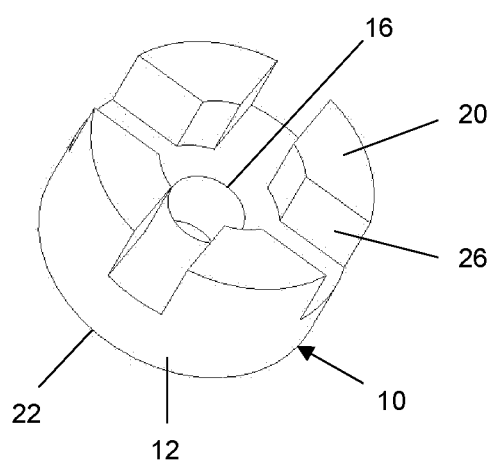
FIG. 1B is a top, side perspective view of the drill and/or K-wire guide.
Figure 1C:
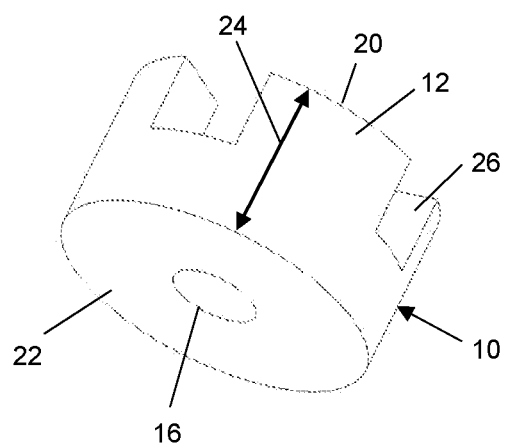
FIG. 1C is a bottom, side perspective view of the drill and/or K-wire guide.

As discussed below, a surgical device and method can be used in assisting in the surgical repair and rehabilitation of damaged and or fractured bone. The surgical device according to the present disclosure is intended to assist in the process of fracture fixation and repair by aiding the mating of locking fasteners to a corresponding bone plate.

The device is preferably a drill and/or K-wire guide that can be removed or remain in position after surgery. The below-discussed features of the drill and/or K-wire guide are not limited for use with particular embodiments thereof, and compatible features are applicable to each embodiment of the drill and/or K-wire guide.

Embodiments of the drill and/or K-wire guide can be assembled to one of multiple apertures provided in a bone plate, of which the apertures are normally used for the passage and mating of locking fasteners to the bone plate. And such bone plates and the corresponding locking fasteners can be used to facilitate fixation and repair of fractured bone fragments.

Embodiments of the drill and/or K-wire guide can be made of the same material as the bone plate, and embodiments of the drill and/or K-wire guide can be made of a disposable material or recyclable material. Furthermore, embodiments of the drill and/or K-wire guide can be made of absorbable material or biomaterial that does not require removal thereof from the bone plate after use, and such absorbable material or biomaterial can be configured to be drillable so that a drill can be inserted through the device after use of a K-wire. Furthermore, embodiments of the drill and/or K-wire guide also can serve in reducing or eliminating soft tissue irritation if the drill and/or K-wire guide remains in position after surgery.

Embodiments of the drill and/or K-wire guide have the general appearance of a manhole on smooth pavement, and when assembled to the bone plate, can have a low profile (e.g., a limited profile or no profile) extending above the surface of the bone plate to reduce or eliminate soft tissue irritation. Embodiments of the drill and/or K-wire guide can be annular shaped (e.g., shaped as a cylinder) with an annular outer surface (e.g., a cylindrical outer surface) having a maximum diameter and a maximum thickness perpendicular to the maximum diameter, and can be engaged to a similarly shaped aperture in the bone plate. Also, rather than being cylindrically shaped and having a cylindrical outer surface, embodiments of the drill and/or K-wire guide can have a conical and/or frusto-conical outer surface having a maximum diameter and a maximum thickness perpendicular to the maximum diameter, and can be engaged to a similarly shaped aperture in the bone plate.

A central portion of embodiments of the drill and/or K-wire guide can have an aperture which itself has a diameter and an orientation, and the aperture can extend through a maximum thickness of the drill and/or K-wire guide. Furthermore, the drill and/or K-wire guide can have a maximum thickness (perpendicular to a maximum diameter thereof) less than, equal to, or slightly greater than maximum depths (perpendicular to maximum diameters thereof) of the apertures of the bone plate to provide a low profile for the drill and/or K-wire guide. Providing the drill and/or K-wire guide with such a maximum thickness provides for a low-profile drill and/or K-wire guide that does not protrude or does not protrude significantly beyond the surfaces of the bone plate. Depending on the dimensions of the apertures in the bone plate, the maximum thicknesses of embodiments of the drill and/or K-wire guide can be less than, equal to, or greater than the maximum diameters thereof. Given that bone plates often include apertures having maximum depths less than maximum diameters thereof, embodiments of the drill and/or K-wire guide can likewise have maximum thicknesses less than maximum diameters thereof to provide for low profiles.

When used as a drill guide, the drill and/or K-wire guide can facilitate use of the locking fasteners (such as locking screws) on a bone plate by facilitating use of a drill to create a hole in bone that aids in properly orienting the locking screw inserted into the hole relative to the bone plate. Furthermore, unlike permanent K-wire holes in a plate, the drill and/or K-wire guide can be removed from the bone plate. An additional advantage of the drill and/or K-wire guide being removable is that the surgeon can insert K-wire through the hole or guide of the drill and/or K-wire guide into the bone to indicate the trajectory of the screw that will replace such K-wire, which is not possible when using the permanent K-wire hole or guide elsewhere along the plate.

Embodiments of the drill and/or K-wire guide can be pressure-fit or mechanically engaged to the apertures formed in the bone plate to facilitate attachment. The pressure-fit attachment can be facilitated by an interference fit with the apertures formed in the bone plate. To provide for the interference fit, the drill and/or K-wire guide can be slightly oversized for receipt in the apertures formed in the bone plate, or the apertures formed in the bone plate can be slightly undersized for receipt of the drill and/or K-guide therein.

Furthermore, to provide for the interference fit, the drill and/or K-wire guide can have a substantially smooth outer surface, or can include surface protuberances/roughenings such as catches, nubs, ratchets, etc. on the outer surface. The apertures formed in the bone plate can be substantially smooth, or can include surface protuberances/roughenings such as catches, nubs, ratchets, etc. In some instances, the outer surface of the drill and/or K-wire guide can engage complimentary or non-complimentary surface protuberances/roughenings provided in the apertures formed in the bone plate. When attached to the bone plate via the pressure-fit attachment, the drill and/or K-wire guide can be pressed into one of the apertures formed in the bone plate.

To facilitate mechanical engagement, the drill and/or K-wire guide can include threads on the cylindrical outer surface thereof to engage complimentary threads provided in an aperture in the bone plate. Such mechanical engagement can be effected by rotating the drill and/or K-wire guide into one of the apertures formed in the bone plate. When the drill and/or K-wire guide includes threads on the cylindrical outer surface, the drill and/or K-wire guide can include an additional feature or features to engage the tip of a screwdriver for easy insertion into and removal from the aperture in the bone plate. The additional screwdriver-engagement feature or features may not be necessary if the drill and/or K-wire guide is made of absorbable material or biomaterial which can remain in position after surgery and/or be drilled through with a drill bit.

A preferred embodiment of the drill and/or K-wire guide of the present invention is generally indicated by the numeral 10 in FIGS. 1A-3B. The drill and/or K-wire guide 10 is provided for receipt in an aperture formed in a bone plate 30 (FIGS. 2A-3B), and the drill and/or K-wire guide 10 can include the above-discussed features that are compatible with one another. As depicted in FIGS. 1A-1C, the drill and/or K-wire guide 10 is generally formed as a cylinder with a cylindrical outer surface 12. The drill and/or K-wire guide 10 has a maximum diameter 14, a central drill or K-wire receiving aperture 16, a top surface 20 at a first end of the drill and/or K-wire guide, a bottom surface 22 at a second end of the drill and/or K-wire guide, and a maximum thickness 24 (perpendicular to the maximum diameter 14) between the top surface 20 and the bottom surface 22. The drill or K-wire receiving aperture 16 can be cylindrical, and the thickness 24 can generally correspond to or be less than the thickness of a bone plate 30 depicted in FIGS. 2 and 3. As discussed above, the maximum diameter 14 of the drill and/or K-wire guide 10 can be less than, equal to, or greater than the maximum thickness 24.

The cylindrical outer surface 12 may be smooth, include protuberances/roughenings, or include threads. These engagement features facilitate attachment of the drill and/or K-wire guides 10 to the bone plate 30 via securing the drill and/or K-wire guide 10 within apertures 32 formed in the bone plate 30. When smooth or including the protuberances/roughenings, the cylindrical outer surface 12 can be configured for pressure-fit attachment into an aperture in the bone plate 30 using the above-discussed features. Furthermore, to facilitate mechanical engagement, the threads formed on the cylindrical outer surface 12 can be used to engage complimentary threads provided in an aperture in the bone plate 30. Additionally, the drill and/or K-wire guide 10 can include a screw-driver-engagement feature 26 to facilitate engagement with a tip of a screw driver (not shown), illustrated here as a recessed cross, for insertion into or removal from apertures 32 in the bone plate 30. If the screw-driver-engagement feature 26 is not provided, the aperture 16 opens through an opening the top surface 20 and the bottom surface 22, and if the screw-driver-engagement feature 26 is provided, the aperture 16 opens through an opening formed in the recess of the screw-driver-engagement feature 26 and the bottom surface 22.

Figure 2A:
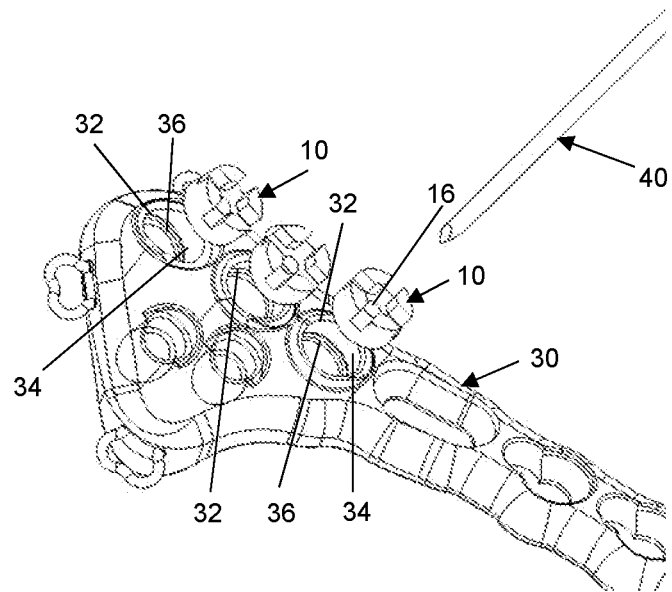
FIG. 2A is a top, side perspective view of multiple drill and/or K-wire guides of FIG. 1A and a K-wire being positioned relative to a bone plate.
Figure 2B:
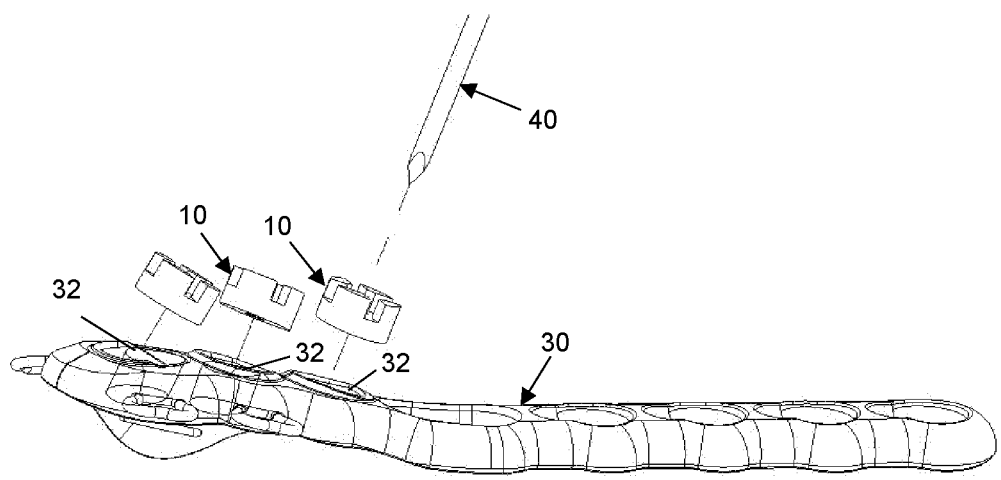
FIG. 2B is a side perspective view of multiple drill and/or K-wire guides of FIG. 1A and a K-wire being positioned relative to a bone plate.

FIGS. 2A and 2B depict an exploded view of three (3) of the devices 10 positioned for insertion into the apertures 32 of the bone plate 30. As depicted in FIG. 2A, each of apertures 32 include an interior sidewall 34 and a shoulder 36. When the devices 10 are inserted into the apertures 32, the cylindrical outer surfaces 12 interface with the sidewalls 34, and the bottom surface 22 interfaces with the shoulders 36. The sidewalls 34 can be smooth, include complimentary protuberances/roughenings, or include threads for engaging complimentary features provided on the cylindrical outer surface 12. The threads provided on the sidewalls 34 are also provided to engage threads on head portions of locking screws (not shown). Furthermore, a K-wire 40 is depicted in FIGS. 2A and 2B as being arranged for insertion into and through the aperture 16 in the center of one of the drill and/or K-wire guide 10.

The apertures 32 have maximum diameters and maximum depths perpendicular to the maximum diameters. As depicted in FIGS. 2A and 2B, the maximum diameters of the apertures 32 are greater than the maximum depths of the apertures 32. As such, the maximum diameter 14 can also greater than the maximum thickness 24 of the drill and/or K-wire guide 10, and the maximum diameter 14 and the maximum thickness 24 can be sized to correspond to the maximum diameters and maximum depths of the apertures 32. To provide for the above-discussed low profile thereof, the maximum thickness 14 of the drill and/or K-wire guide 10 is less than, equal to, or slightly greater than maximum depths of the apertures 32. As such, the drill and/or K-wire guide 10 can be received in the apertures such that the drill and/or K-wire guide does not protrude or does not protrude significantly beyond upper and lower surfaces of the bone plate 30.

Figure 3A:
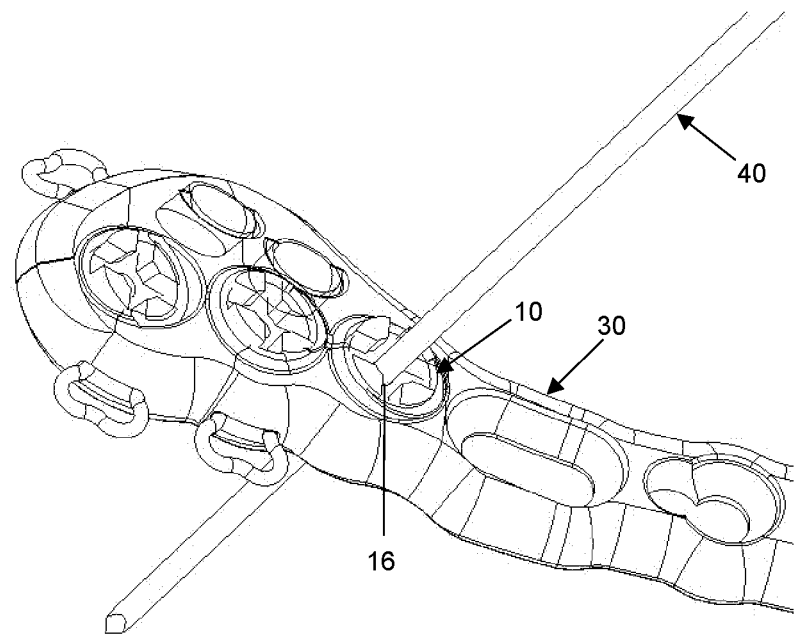
FIG. 3A is a first, top, side perspective view of multiple drill and/or K-wire guides of FIG. 1A received in apertures formed in a bone plate and a K-wire inserted through an aperture of one of the drill and/or K-wire guides.
Figure 3B:
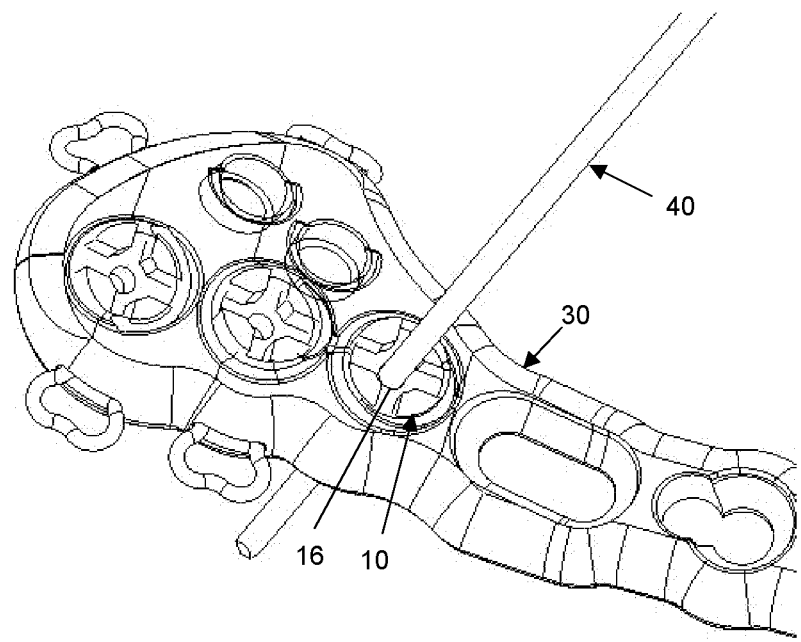
FIG. 3B is a second, top, side perspective view of multiple drill and/or K-wire guides of FIG. 1A received in apertures formed in a bone plate and a K-wire inserted through an aperture of one of the drill and/or K-wire guides.

FIGS. 3A and 3B depict the drill and/or K-wire guide 10 assembled to the bone plate 30 via receipt in the aperture 32. The bone plate 30 is intended for fracture fixation and repair. The pre-assembly of the drill and/or K-wire guides 10 to the bone plate 30 prior to surgery serves to limit interference of soft tissue including, but not limited to, tendons and ligaments during implantation of the bone plate 30.

The K-wire 40 is depicted in FIGS. 3A and 3B as being inserted through the aperture 16 of one of the devices 10 provided in one of the apertures 32. The orientation of the K-wire 40 in the aperture 16 corresponds to a trajectory/orientation of the locking screw ultimately received in the corresponding aperture 32. During implantation of the bone plate 30, the K-wire 40 can thus be used to permit positioning and repositioning of the bone plate 30 to chose a proper placement of the bone plate 30 so that the locking screw ultimately received in the aperture 32 is properly oriented with respect to bone. A drill (not shown) during implantation of the bone plate 30, with or without use of the K-wire 40, can be inserted through the aperture 16 to drill a hole into bone to also provide for proper orientation of the locking screw ultimately received in the aperture 32. Furthermore, if the drill and/or K-wire guides 10 10 are made of an absorbable material or biomaterial which can remain in position after surgery, a drill (not shown) can be used to drill through the drill and/or K-wire guide 10 10 into bone during placement of the bone plate 30 to facilitate receipt of the locking screws in drilled apertures (not shown) through the drill and/or K-wire guide 10 10 and into bone.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of attaching a bone plate to bone during surgery, the method comprising:
    positioning a first guide in a first aperture formed in a first portion of the bone plate, and positioning a second guide in a second aperture formed in a second portion of the bone plate;
    after positioning of the first guide and the second guide, positioning the bone plate adjacent to the bone, inserting a first K-wire through a third aperture in the first guide and into the bone to maintain the first portion of the bone plate in position relative to the bone, and inserting a second K-wire through a fourth aperture in the second guide and into the bone to maintain the second portion of the bone plate in position relative to the bone;
    removing the first K-wire from the third aperture in the first guide and the bone, and then inserting a drill through the third aperture in the first guide and into the bone to form a first pilot hole;
    after forming the first pilot hole, removing the first guide from the first aperture, and then inserting a first bone screw through the first aperture and into the first pilot hole to secure attachment of the first portion of the bone plate to the bone;
    removing the second K-wire from the fourth aperture in the second guide and the bone, and then inserting the drill through the fourth aperture in the second guide and into the bone to form a second pilot hole; and
    after forming the second pilot hole, removing the second guide from the second aperture, and then inserting a second bone screw through the second aperture and into the second pilot hole to secure attachment of the second portion of the bone plate to the bone.

2. The method of claim 1, wherein each of the first guide and the second guide includes a first end, an opposite second end, an annular outer surface extending between the first end and the second end, a maximum diameter, a maximum thickness perpendicular to the maximum diameter, a first opening at the first end, and a second opening at the second end, and the third aperture and the fourth aperture extend between each of the first opening and the second opening of the first guide and the second guide, respectively.

3. The method of claim 2, wherein each of the annular outer surfaces of the first guide and the second guide is substantially cylindrical.

4. The method of claim 2, wherein each of the annular outer surfaces of the first guide and the second guide include threads, and each of the first aperture and the second aperture of the bone plate includes complimentary threads for engaging the threads of the first guide and the second guide, respectively.

5. The method of claim 2, wherein each of the annular outer surfaces of the first guide and the second guide includes a surface protuberance and/or a surface roughening that provides for an interference fit with the first aperture and the second aperture, respectively, of the bone plate.

6. The method of claim 2, wherein the maximum thickness of one of the first guide and the second guide is less than, equal to, or slightly greater than a maximum depth of a corresponding one of the first aperture and the second aperture of the bone plate to provide a low-profile for the one of the first guide and the second guide.

7. The method of claim 2, wherein each of the first guide and the second guide includes a first end surface and a tool-engaging recess, the first end surface being provided at the first end, the tool-engaging recess being formed in the first end surface, and the first opening communicating with a portion of the tool-engaging recess.

8. The method of claim 7, further comprising engaging a tool to the tooling-engaging recess of each the first guide and the second guide to facilitate positioning of the first guide and the second guide in the first aperture and the second aperture, respectively, of the bone plate.

9. A method of attaching a bone plate to bone during surgery, the method comprising:
    positioning a first guide in a first aperture formed in a first portion of the bone plate;
    after positioning of the first guide, positioning the bone plate adjacent to the bone, inserting a first K-wire through a second aperture in the first guide and into the bone to maintain the first portion of the bone plate in position relative to the bone;
    after inserting the first K-wire, inserting a first bone screw into a third aperture formed in a second portion of the bone plate and into bone to secure attachment of the second portion of the bone plate to the bone;
    removing the first K-wire from the second aperture in the first guide and the bone, and then inserting a drill through the second aperture in the first guide and into the bone to form a first pilot hole;
    after forming the first pilot hole, removing the first guide from the first aperture, and then inserting a second bone screw through the first aperture and into the first pilot hole to secure attachment of the first portion of the bone plate to the bone.

10. The method of claim 9, further comprising positioning a second guide in a fourth aperture formed in a third portion of the bone plate, and inserting a second K-wire through a fifth aperture formed in the second guide and into bone to maintain the third portion of the bone plate in position relative to the bone.

11. The method of claim 9, wherein the first guide includes a first end, an opposite second end, an annular outer surface extending between the first end and the second end, a maximum diameter, a maximum thickness perpendicular to the maximum diameter, a first opening at the first end, and a second opening at the second end, and the second aperture extends between the first opening and the second opening.

12. The method of claim 11, wherein the annular outer surface of the first guide is substantially cylindrical.

13. The method of claim 11, wherein the annular outer surface of the first guide includes threads, and the first aperture of the bone plate includes complimentary threads for engaging the threads of the first guide.

14. The method of claim 11, wherein the annular outer surface of the first guide includes a surface protuberance and/or a surface roughening that provides for an interference fit with the first aperture.

15. The method of claim 11, wherein the maximum thickness of the first guide is less than, equal to, or slightly greater than a maximum depth of the first aperture of the bone plate to provide a low-profile for the first guide.

16. The method of claim 11, wherein the first guide includes a first end surface and a tool-engaging recess, the first end surface being provided at the first end, the tool-engaging recess being formed in the first end surface, and the first opening communicating with a portion of the tool-engaging recess.

17. The method of claim 16, further comprising engaging a tool to the tooling-engaging recess of the first guide to facilitate positioning of the first guide in the first aperture of the bone plate.

18. A method of attaching a bone plate to bone during surgery, the method comprising:
positioning a first guide in a first aperture formed in a first portion of the bone plate, and positioning a second guide in a second aperture formed in a second portion of the bone plate;
after positioning of the first guide and the second guide, positioning the bone plate adjacent to the bone, inserting a first K-wire through a third aperture in the first guide and into the bone to maintain the first portion of the bone plate in position relative to the bone, and inserting a second K-wire through a fourth aperture in the second guide and into the bone to maintain the second portion of the bone plate in position relative to the bone;
after inserting the first K-wire and the second K-wire, inserting a first bone screw into a fifth aperture formed in a third portion of the bone plate and into bone to secure attachment of the third portion of the bone plate to the bone;
removing the first K-wire from the third aperture in the first guide and the bone, and then inserting a drill through the third aperture in the first guide and into the bone to form a first pilot hole;
after forming the first pilot hole, removing the first guide from the first aperture, and then inserting a second bone screw through the first aperture and into the first pilot hole to secure attachment of the first portion of the bone plate to the bone;
removing the second K-wire from the fourth aperture in the second guide and the bone, and then inserting the drill through the fourth aperture in the second guide and into the bone to form a second pilot hole; and
after forming the second pilot hole, removing the second guide from the second aperture, and then inserting a third bone screw through the second aperture and into the second pilot hole to secure attachment of the second portion of the bone plate to the bone.

19. The method of claim 18, wherein each of the first guide and the second guide includes a first end, an opposite second end, an annular outer surface extending between the first end and the second end, a maximum diameter, a maximum thickness perpendicular to the maximum diameter, a first opening at the first end, and a second opening at the second end, and the third aperture and the fourth aperture extend between each of the first opening and the second opening of the first guide and the second guide, respectively.

20. The method of claim 19, wherein each of the annular outer surfaces of the first guide and the second guide include threads, and each of the first aperture and the second aperture of the bone plate includes complimentary threads for engaging the threads of the first guide and the second guide, respectively.

* * * * *